Sept. 24, 1968     D. A. McCALLUM     3,402,938

TRANSPORT ATTACHMENT FOR IMPLEMENT

Filed Oct. 10, 1966           2 Sheets-Sheet 1

INVENTOR
DONALD A. McCALLUM

ATT'Y

Sept. 24, 1968   D. A. McCALLUM   3,402,938
TRANSPORT ATTACHMENT FOR IMPLEMENT
Filed Oct. 10, 1966   2 Sheets-Sheet 2
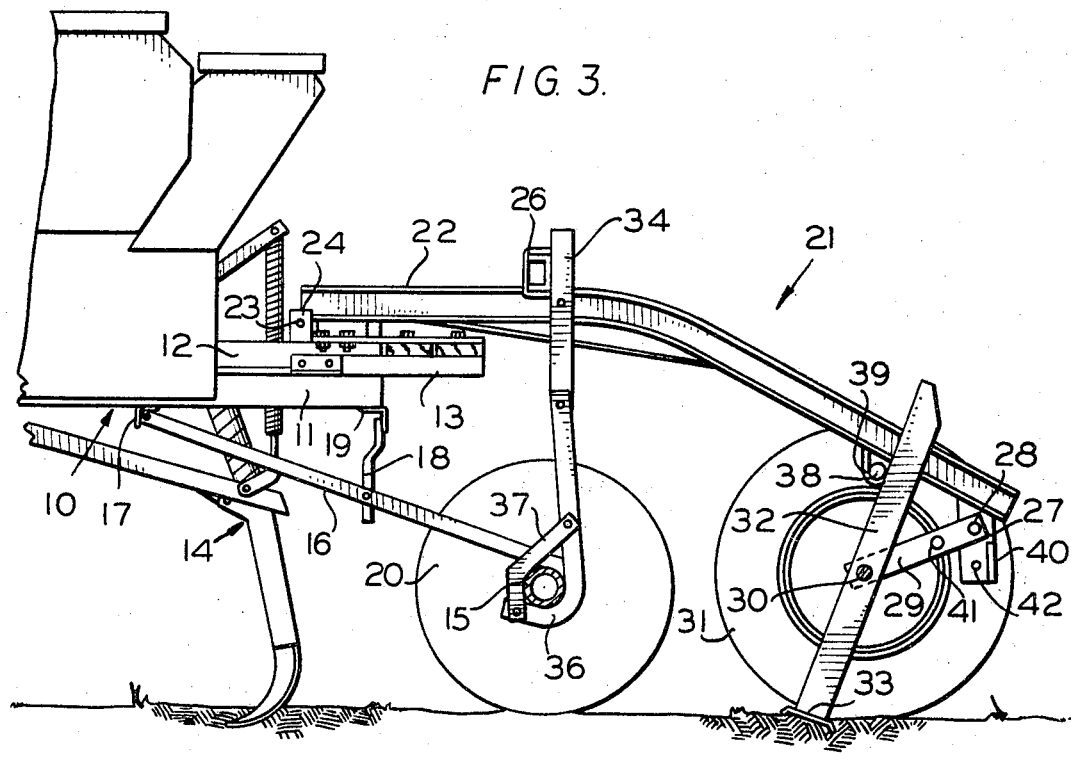
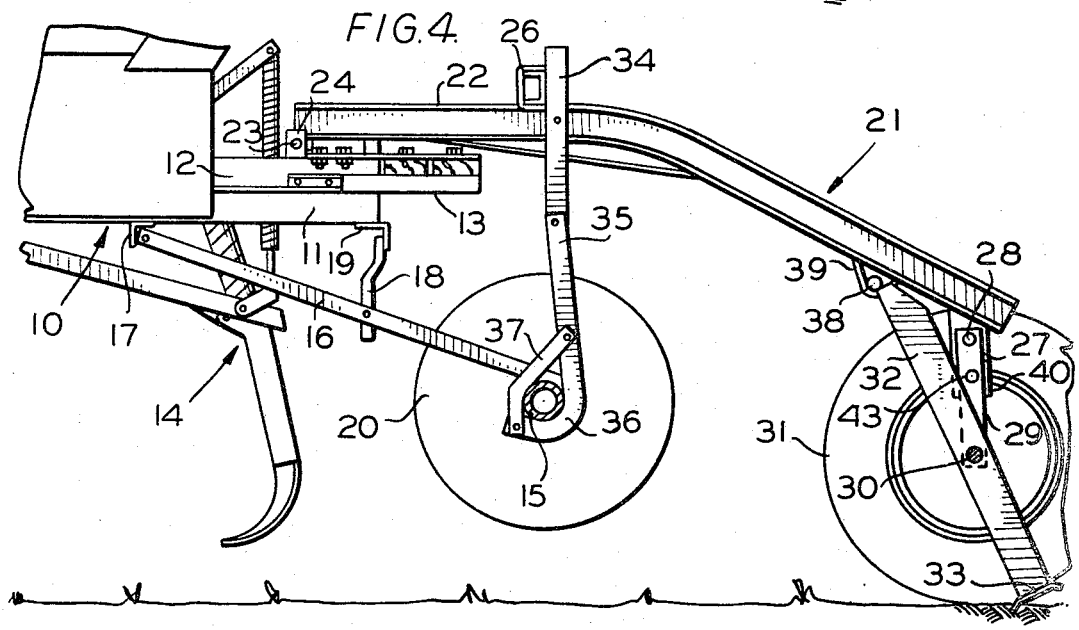
INVENTOR
DONALD A. McCALLUM
ATT'Y

United States Patent Office 3,402,938
Patented Sept. 24, 1968

3,402,938
TRANSPORT ATTACHMENT FOR IMPLEMENT
Donald A. McCallum, Burlington, Ontario, Canada, assignor to International Harvester Company, Chicago, Ill., a corporation of Delaware
Filed Oct. 10, 1966, Ser. No. 585,349
3 Claims. (Cl. 280—43.17)

ABSTRACT OF THE DISCLOSURE

A transport attachment for an implement such as a grain drill having earth-working tools and including a supporting structure connectible to the implement frame and having a ground-engaging wheel unit mounted thereon for swinging in an arc with respect to the frame when the implement is propelled forwardly, to force the frame upwardly until the earth-working tools are elevated above the ground.

---

This invention relates to agricultural implements, particularly to an implement of the tractor drawn type, and an object of the invention is the provision of a novel transport attachment for an implement.

Another object of the invention is the provision of transport means quickly attachable to an implement and including novel means for raising the working tools above the ground for transporting the implement over highways and the like.

Other objects and advantages of the invention will become clear from the following detailed description when read in conjunction with the accompanying drawings wherein:

FIGURE 3 is a sectional view similar to FIGURE 1 showing the transport attachment prior to movement of the implement to its transport position; and FIGURE 4 is a sectional view similar to FIGURE 3 showing the transport attachment in the transport position of the implement.

Figure 1:
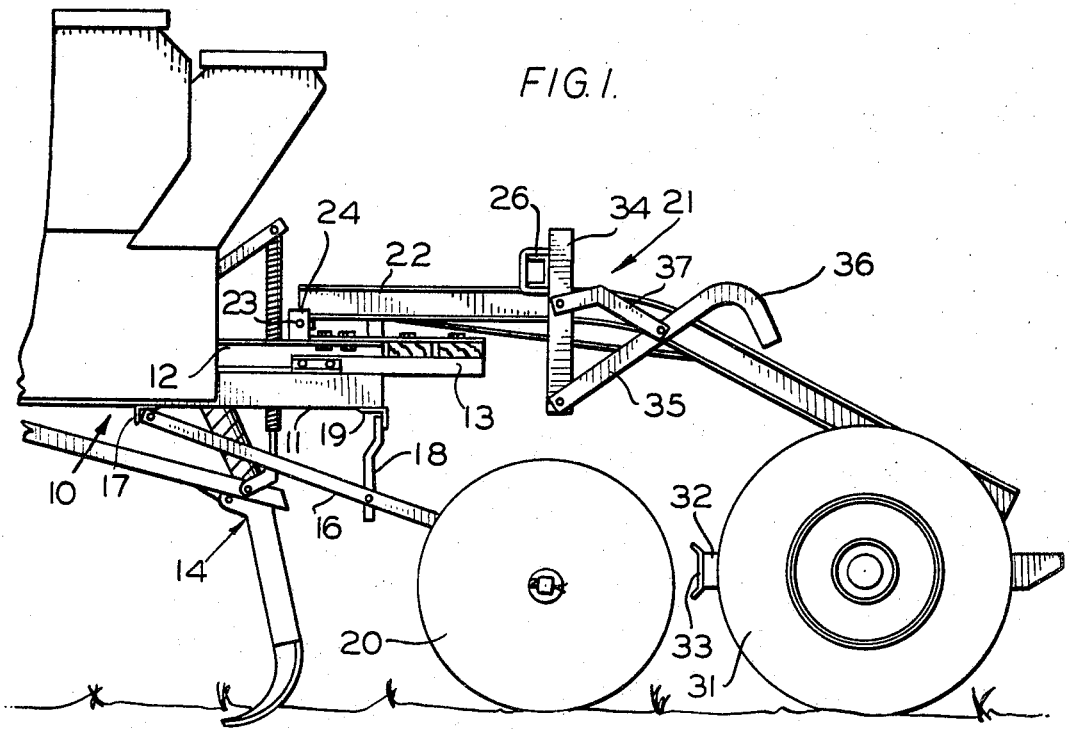
FIGURE 1 is a view in side elevation of the rear end of an implement, the forward end of which is connected to a tractor to be propelled thereby, having a transport attachment connected thereto embodying the features of this invention.
Figure 2:
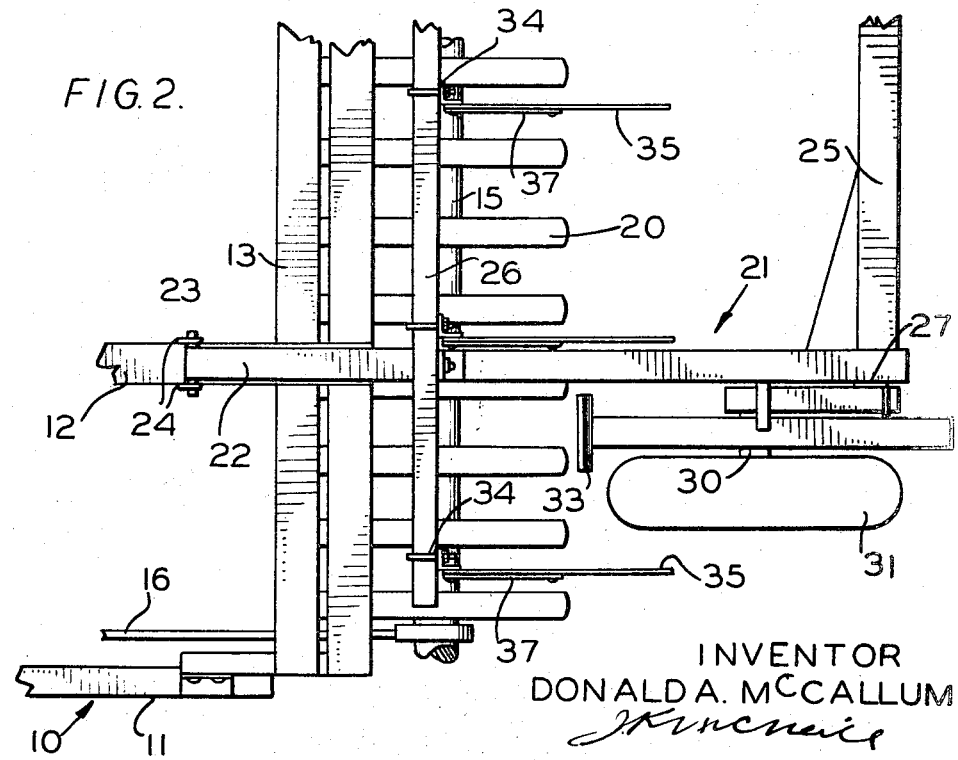
FIGURE 2 is a partial plan view of a portion of the structure shown in FIGURE 1.

In the drawings the numeral 10 designates the frame of a grain drill of well-known construction, the forward end of which is adapted to be connected to a tractor in draft receiving relation and which includes longitudinally extending laterally spaced side bars 11, only one of which is shown, and two or more laterally spaced bars 12, only one of which is shown carrying at their rear ends a transverse platform 13, the ends of which are secured to side bars 11.

Conventional furrow opener units 14 are mounted on the implement frame, and a press wheel carrier 15 extends transversely of the implement frame rearwardly of the furrow opener units 14 and is mounted on the frame by two or more laterally spaced straps 16, only one of which is shown, the forward ends of which are connected to an angle bar 17 secured to the underside of frame 10. Bracing the strap 16 is a hanger 18 connected to the strap and to an angle 19 affixed to side bars 11.

A plurality of press wheels 20 are mounted on carrier 15, one for each furrow opener unit 14, and in normal operation support the rear portion of the implement. In order to transport the implement over highways and the like, a transport attachment is provided and designated by the numeral 21. The attachment comprises laterally spaced longitudinally extending beams 22 the forward end of each of which is pivotally connected at 23 between a pair of lugs 24 affixed to member 12. The rear ends of member 12 are connected by a transverse frame member 25, and forwardly thereof by a member 26, the ends of which extend laterally beyond the frame members 12.

A vertically extending bracket 27 is secured to and extends downwardly from the rear end of each frame member 22 and has pivotally connected thereto at 28 one end of a wheel-carrying arm 29 the other end of which carries a stub axle 30 upon which is mounted a wheel 31.

Also mounted on stub axle 30 between wheel 31 and arm 29 is a vaulting or actuating arm 32. Arm 32 is pivoted medially of its end on axle 30 and a ground engaging foot 33 is provided at one end of the arm at a distance from the axis 30 greater than the radius of wheel 31 so that, upon swinging of arm 32 and foot portion 33 from the position of FIGURE 3 to that of FIGURE 4, a vaulting effect is imparted to the wheels 31. In order to accomplish this and to lift the implement frame 10, the transport frame 21 is operatively locked to the implement frame by means comprising spaced brackets 34 affixed to and depending from transverse bar 26, a link 35 being pivotally connected at its upper end to bracket 34 and having its lower end bent into a hook shape as at 36 to partly encircle carrier 15. Another link 37 is bent to engage the opposite side of carrier 15 and is connected at its ends to link 35. Transport carrier 21 is thus held against vertical swinging movement about the pivot 23 on the implement frame and the implement is ready to be moved into transport position.

In the position of parts shown in FIGURE 3, wheel arm 29 is disposed generally in a horizontal direction toward the line of travel and foot portion 33 of actuating arm 32 engages the ground just ahead of the contact point of wheel 31 with the ground. The end of arm 32 opposite foot 33 engages a stop member 38 carried by a strap 39 affixed to the rear portion of bear 22. Due to the reaction of foot 33 against the ground and of the other end of arm 32 against stop 39, forward motion of the implement frame 10 causes wheel arm 29 to swing counterclockwise about pivot 28, causing actuating arm 32 to also swing counterclockwise until foot portion 33 reaches the position of FIGURE 4. In this position arm 29 engages a stop 40 on lug 27 and openings 41 and 42 in arm 29 and bracket 27, respectively, register, at which point axle 30 of the wheel is overcenter with respect to the pivot 28.

By virtue of the reaction of foot 33 against the ground and of the other end of arm 32 against stop 38, forward motion of the implement raises it from the position of FIGURE 3 to that of FIGURE 4. In this position the upper end of arm 32 slides past stop 38, and a locking pin 43 is inserted in openings 41 and 42 to hold wheels 31 rigid with respect to the frame in transporting the implement.

After the implement has been transported to the location desired the transport mechanism 21 may be disconnected from the implement frame at 23 and linkage 35, 37, disconnected from the carrier 15 and reconnected to the transport frame in the position shown in FIGURE 1. The transport carrier frame may be retained with the implement, if desired, as in FIGURE 1, in which case the transport frame rises and falls about the axis of pivot 23. Arm 32 is then disposed horizontally as shown, and suitable holding means, not shown, provided to hold the actuating arm 32 in this position during operation of the implement.

As shown in FIGURE 4, the earth-working tools 14 and press wheels 20 are elevated above the ground during transport, and when the implement is to be replaced in operation arm 32 is disposed with the foot portion 33 forwardly of wheel 31 and is revolved counterclockwise until the foot 33 engages the ground ahead of the wheel. Links 35 and 37 are again connected to carrier 15 and the implement is again ready to be raised to transport position.

It is believed that the construction and operation of the novel implement transport mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In a transport attachment for an implement having a tool-carrying frame adapted for connection to a tractor, a transport frame connected to said tool-carrying frame, a wheel arm, a wheel mounted on one end of said arm, means pivotally connecting the other end of said arm to said transport frame for swinging of the wheel arm about its pivot axis from a generally horizontal position upwardly to a generally vertical position, means responsive to forward motion of the implement for causing said wheel arm to swing to said generally vertical position, comprising an actuating arm mounted on the axis of said wheel having a length from one end thereof to said axis greater than the radius of the wheel, said actuating arm having one end reactable against the ground in advance of said wheel and effective, in response to forward movement of the tool-carrying frame, to elevate said tool-carrying frame and to cause said wheel to vault forwardly to a position in advance of said one end of said actuating arm, and stop means on the transport frame rearwardly of said wheel arm and engageable therewith to limit the upward swinging thereof.

2. In a transport attachment for an implement having a tool-carrying frame adapted for connection to a tractor, a transport frame connected to said tool-carrying frame, a wheel arm, a wheel mounted on one end of said arm, means pivotally connecting the other end of said arm to said transport frame for swinging of the wheel arm about its pivot axis from a generally horizontal position upwardly to a generally vertical position, means responsive to forward motion of the implement for causing said wheel arm to swing to said generally vertical position, comprising an actuating arm mounted on the axis of said wheel having a length from one end thereof to said axis greater than the radius of the wheel, said actuating arm having one end reactable against the ground in advance of said wheel and effective to raise the tool-carrying frame in response to forward movement of the latter, said wheel arm being swingable upwardly to an overcenter position with respect to a vertical line through the pivot of said wheel arm on the transport frame, stop means on the transport frame rearwardly of said vertical line engageable in said overcenter position with said wheel arm to limit the upward swinging thereof, said actuating arm being pivoted medially of its ends on said wheel axis and swingable with said wheel arm, and another stop means on the transport frame engageable with the other end of said actuating arm, the ground engaging end of said actuating arm being swingable to a position rearwardly of said wheel and the other end of said actuating arm being disengaged from said other stop means when said wheel arm moves to its overcenter position.

3. The invention set forth in claim 2, wherein means are provided for locking said wheel arm in its overcenter position to maintain the tool-carrying frame in its raised position during transport.

References Cited

UNITED STATES PATENTS

| 2,620,610 | 12/1952 | Chambers | 172—240 |
| 2,738,634 | 3/1956 | Garver | 172—240 X |
| 2,921,640 | 1/1960 | Roppel | 172—240 |

LEO FRIAGLIA, *Primary Examiner.*